(12) United States Patent
Kato

(10) Patent No.: US 7,581,883 B2
(45) Date of Patent: Sep. 1, 2009

(54) RADIOGRAPHIC APPARATUS

(75) Inventor: Katsushi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/252,547

(22) Filed: Oct. 16, 2008

(65) Prior Publication Data
US 2009/0116620 A1    May 7, 2009

(30) Foreign Application Priority Data
Nov. 1, 2007   (JP) .............................. 2007-284728

(51) Int. Cl.
G03C 5/16      (2006.01)
H01J 31/49     (2006.01)
(52) U.S. Cl. ...................... 378/167; 378/189
(58) Field of Classification Search ......... 378/167–170, 378/189–192, 98.8, 19
See application file for complete search history.

(56) References Cited

U.S. PATENT DOCUMENTS 3,457,406 A  *  7/1969  Reiniger ................. 378/181
5,673,302 A  *  9/1997  Kriecha et al. ........... 378/167
6,592,257 B1 *  7/2003  Heidsieck et al. ........ 378/189
6,934,361 B2 *  8/2005  Ohkoda ................. 378/98.8
2003/0039332 A1 * 2/2003 Bavendiek et al. ........ 378/58

FOREIGN PATENT DOCUMENTS

JP     2000-116635 A    4/2000
JP     2000-205082 A    7/2000

* cited by examiner

Primary Examiner—Irakli Kiknadze
(74) Attorney, Agent, or Firm—Canon U.S.A., Inc. I.P. Division

(57) ABSTRACT

A cover is elastically supported on a frame by elastic members. Engaging members are provided between the frame and the cover, and the cover is fixed to the frame by the engaging members as necessary. In the first state in which the movement of the cover is not restricted, the cover is movable with respect to the frame. In the second state, the cover is engaged with the frame and is fixed.

15 Claims, 11 Drawing Sheets

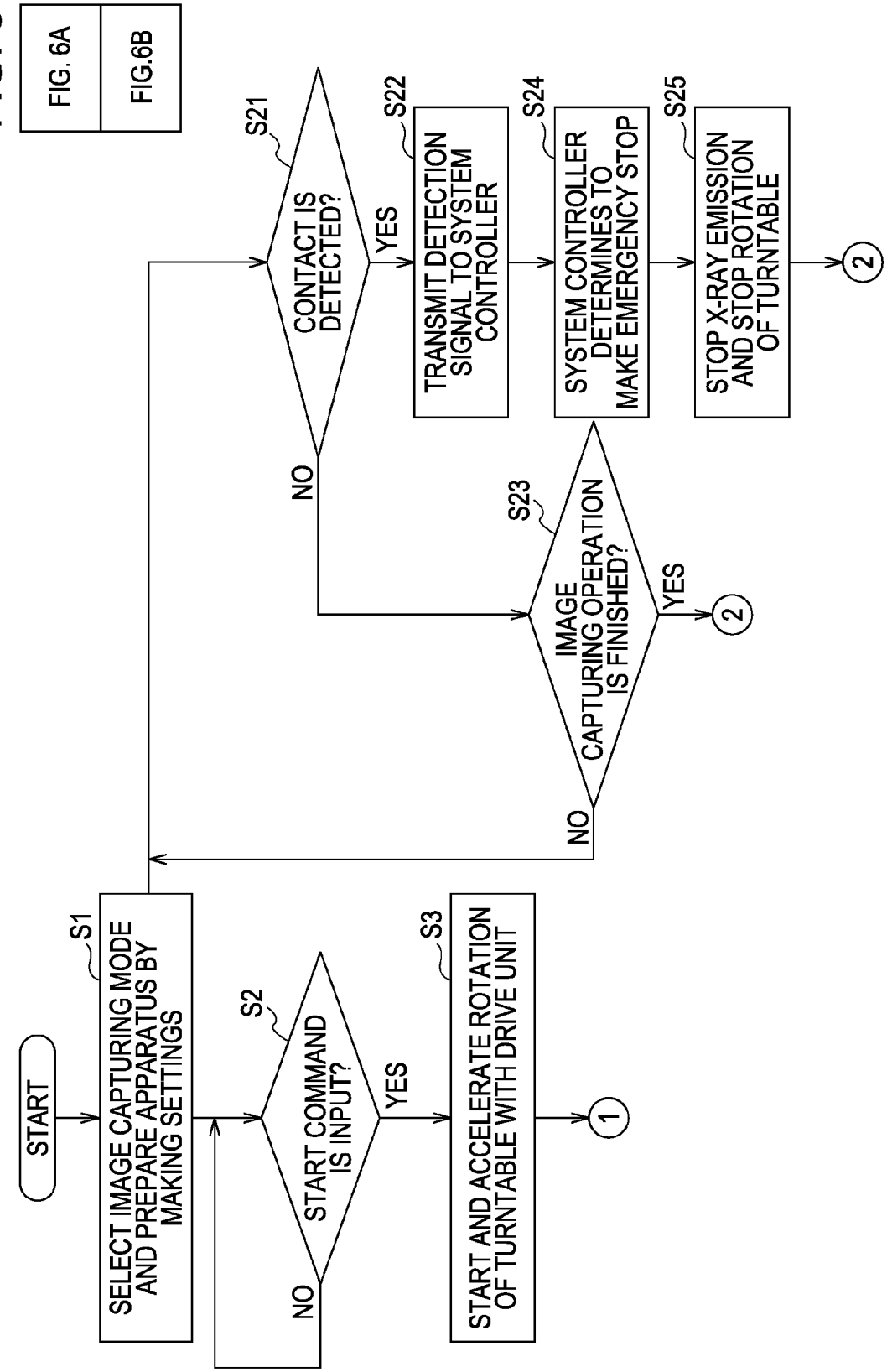

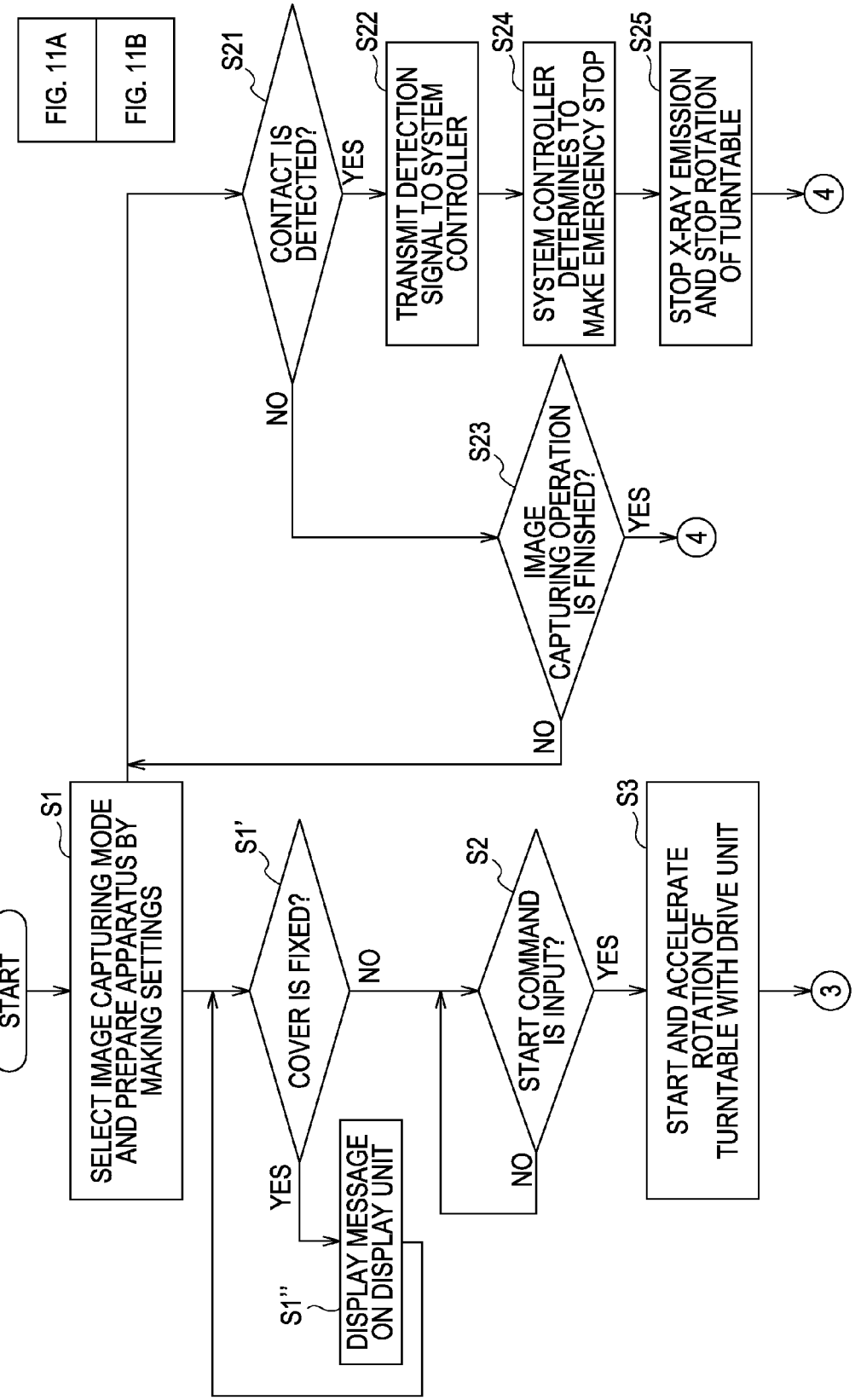

RADIOGRAPHIC APPARATUS

BACKGROUND OF THE INVENTION

1. Field of the Invention

The present invention relates to a radiographic apparatus which obtains image information by detecting X-rays that pass through a subject with an image capturing unit having an X-ray detector mounted therein.

2. Description of the Related Art

In general, a radiographic apparatus includes an image capturing unit disposed at a position spaced from an X-ray generator and having an X-ray detector mounted therein. An image of a subject, such as a human body, is captured while the subject is placed between the X-ray generator and the image capturing unit. A required image is obtained by emitting X-rays from the X-ray generator after the image capturing unit is positioned relative to the X-ray generator and the subject.

Recently, the processing speed of image processing apparatuses has considerably increased and apparatuses for capturing not only two-dimensional still images but also three-dimensional images and moving images have come into widespread use.

The three-dimensional images have generally been captured using computed tomography (CT) apparatuses. However, recently, a method for obtaining three-dimensional images as a result of calculation based on two-dimensional images using a two-dimensional sensor such as an image intensifier (I.I.) or a flat panel detector has also been used.

In an image capturing method using a C-arm image capturing apparatus, an X-ray generator and an image capturing unit are supported by a C-arm and are rotated around a subject lying on a subject support, such as a bed, so that X-ray projection images of the subject can be obtained at different angles.

Japanese Patent Laid-Open No. 2000-116635 describes a radiographic apparatus which captures X-ray projection images of a subject at different angles by emitting X-rays from an X-ray generator while a subject standing on a turntable is rotated. Since a relative movement occurs between the image capturing system and the subject, multiple two-dimensional X-ray projection images are obtained. The thus-obtained X-ray projection images are used to obtain a three-dimensional image by calculation.

To obtain clear images, it is important to position the X-ray detector included in the image capturing unit as close to the subject as possible. In addition, to obtain an image that covers a large area of the subject, it is necessary to increase the area of the X-ray detector. Therefore, the size of the image capturing unit that includes the X-ray detector increases accordingly. As a result, in the image capturing apparatus which moves the image capturing system and the subject relative to each other, there is a risk that a part of the image capturing unit will come into contact with or collide with the subject. In such a case, there is a possibility that the relative movement required in the image capturing operation will be blocked or the subject will be injured.

Accordingly, a radiographic apparatus having a safety mechanism including a moving unit and a detecting unit for minimizing the damage is known. In this apparatus, an impact applied when the image capturing unit collides with the subject is suppressed and movements of movable components are stopped when a contact is detected.

Japanese Patent Publication No. 3-561 describes an apparatus including a contact detection mechanism, which is an example of a safety mechanism. In this type of apparatus, it is assumed that the image capturing operation is performed while the subject and the image capturing unit are not in contact with each other.

On the other hand, the most common use of the radiographic apparatus is to obtain a two-dimensional still image of, for example, an appendage like a breast of a human body in a still-image capturing operation. In the still-image capturing operation, the subject is positioned as close to the image capturing unit as possible and the operation is performed while the breasts, the chin, etc., of the subject are in contact with an outer cover portion of the image capturing unit. Thus, the detection area of the X-ray detector can be maximally used and high resolution images can be obtained.

Japanese Patent Laid-Open No. 2000-205082 describes a radiographic apparatus which emits X-rays while rotating a subject standing on a turntable. This radiographic apparatus has a first image capturing mode in which X-ray projection images are obtained from all directions in the range of 360° around the subject and a second image capturing mode in which a two-dimensional still image of the subject is obtained.

The above-described radiographic apparatus including the image capturing unit provided with the safety mechanism including the moving unit and the detecting unit has the following problem. That is, in the image capturing operation performed while the subject and the image capturing unit are in contact with each other, it is difficult to position the subject and the image capturing unit with respect to each other.

To solve this problem, a radiographic apparatus has been proposed in which a contact detection device including a moving unit and a detecting unit can be detachably attached to an image capturing unit. According to this apparatus, the positioning process can be facilitated.

However, the size of the contact detection device including the detecting unit is large enough to cover most of the image capturing unit so that contact or collision can be detected in a large area. In addition, since the contact detection device must be sufficiently rigid, the weight thereof is large. Therefore, it is very burdensome for an operator to attach and detach the contact detection device.

In addition, a space, a shelf, etc., is necessary for temporarily storing the contact detection device while it is not used. Therefore, in facilities that are not very large, there is a problem that space cannot be efficiently used.

In addition, the contact detection device is a precision device, and is easily damaged if it is roughly handled. Therefore, the contact detection device must be handled with care in the process of attaching or detaching the contact detection device or after it is detached. Thus, a burden is imposed on the user. In addition, an external body having a double-layer structure must be formed and the number of components is increased accordingly. Therefore, high costs are incurred.

SUMMARY OF THE INVENTION

The present invention provides a radiographic apparatus which includes a safety mechanism against contact or collision, which allows a subject and an image capturing unit to be easily positioned with respect to each other in a still-image capturing operation, and which can be easily handled.

A radiographic apparatus according to an embodiment of the present invention has the following arrangement.

That is, a radiographic apparatus includes an image capturing unit having an X-ray detector mounted therein and obtains image data by detecting X-rays that pass through a subject. The radiographic apparatus includes a buffer member arranged at an outer periphery of the image capturing unit, the buffer member being capable of moving in an elastic manner and a restraining member configured to restrain the movement of the buffer member. The restraining member is capable of selecting a first state in which the movement of the buffer member is not restricted and a second state in which the movement of the buffer member is restricted.

Other features and aspects of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 6A and 6B show a flowchart of a basic image capturing operation in the CT image capturing mode.

FIGS. 11A and 11B show a flowchart of a basic image capturing operation in the CT image capturing mode according to the second embodiment.

DESCRIPTION OF THE EMBODIMENTS

Embodiments of the present invention will be described in detail in accordance with the accompanying drawings.

Figure 1:
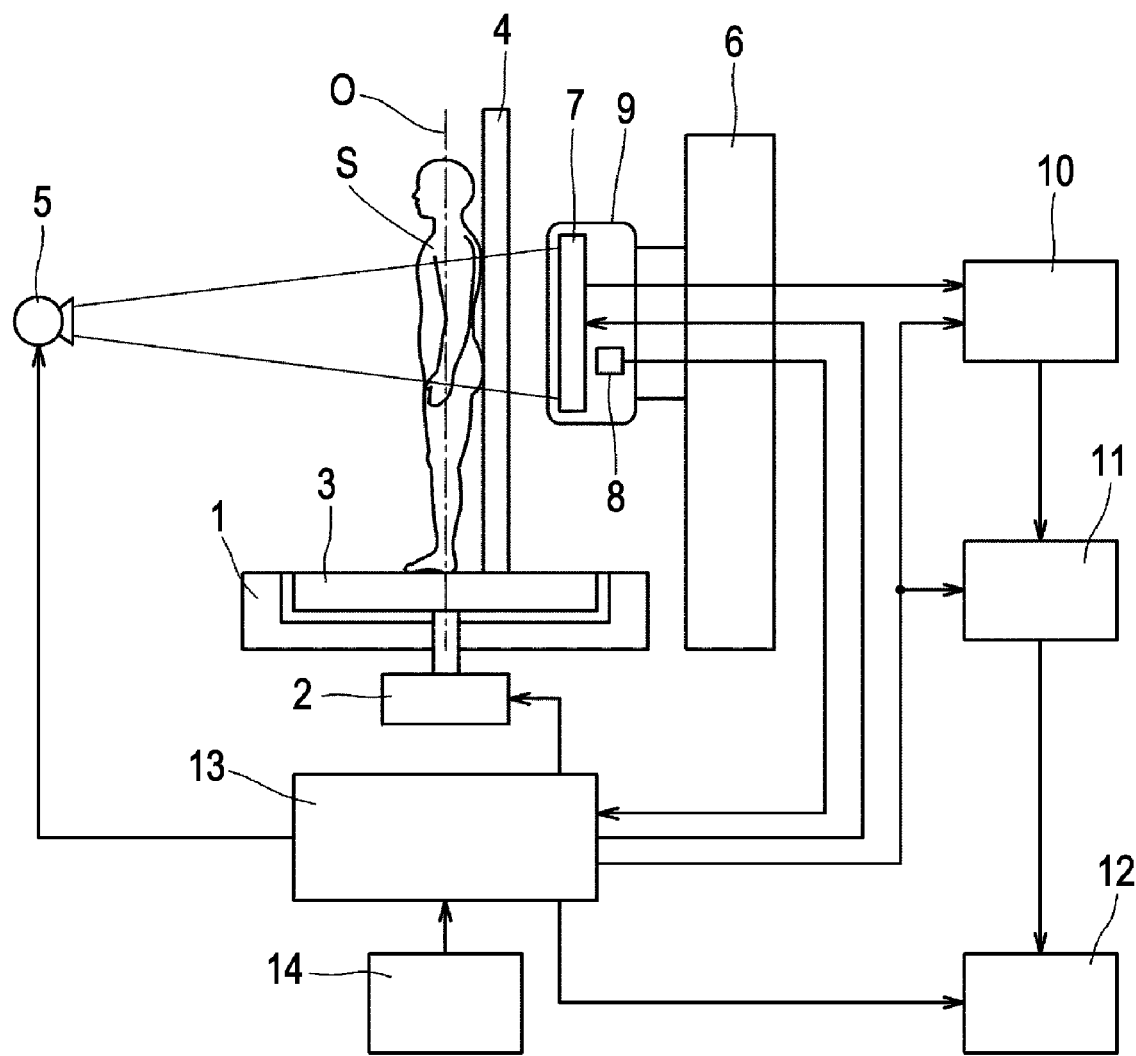
FIG. 1 is a schematic diagram illustrating a radiographic apparatus according to a first embodiment of the present invention in a CT image capturing mode.

FIG. 1 is a schematic diagram illustrating a radiographic apparatus according to a first embodiment of the present invention in a CT image capturing mode. A platform 1 for receiving a subject S has a turntable 3 which is driven by a drive unit 2 and which is rotatable about a rotational center O. A detection mechanism (not shown) is provided for detecting an angular position and a rotational speed of the turntable 3. A support member 4 for supporting and retaining the subject S at a position that substantially coincides with the rotational axis O is placed on the turntable 3. A portion of the support member 4 that is disposed in an X-ray irradiation area is made of a material with high X-ray permeability.

An X-ray tube 5 which functions as an X-ray generator is disposed in front of the subject S. A chassis 6 positioned behind the subject S has an X-ray detector 7 and an image capturing unit 9. The X-ray detector 7 includes a scintillator having a known structure, a photodetector, an electric circuit, etc., and functions as an X-ray image receiver for detecting an X-ray image. The image capturing unit 9 includes a contact detector 8 for detecting a contact. The X-ray tube 5 and the X-ray detector 7 are disposed so as to face each other to form an image capturing system. The X-ray tube 5 is supported by a support mechanism (not shown) and is structured such that the direction and position, such as height, of the X-ray emission can be adjusted. The chassis 6 includes a mechanism capable of moving the image capturing unit 9 at least in the vertical direction, so that the image capturing unit 9 can be positioned with respect to the X-ray tube 5 and the subject S.

The X-ray detector 7 is connected to a data collecting unit 10 for storing the obtained X-ray image data. An output from the data collecting unit 10 is supplied to a reconstructing unit 11, which performs a calculation process for the stored image data, and an image obtained as a result of the calculation process is displayed by a display unit 12. The display unit 12 may be, for example, a computer display. However, similar effects may also be obtained by using an electric bulletin board, a unit for transmitting messages by sound, etc., in place of or in addition to the computer display.

The radiographic apparatus has a system controller 13 that controls the overall operation of the radiographic apparatus. The system controller 13 is electrically connected to the drive unit 2, the X-ray tube 5, the X-ray detector 7, the contact detector 8, the data collecting unit 10, the reconstructing unit 11, and the display unit 12. The system controller 13 receives outputs from an input unit 14 for setting the contact detector 8, selecting an image capturing mode, setting various parameters, and issuing an operation start command and the like.

Figure 2:
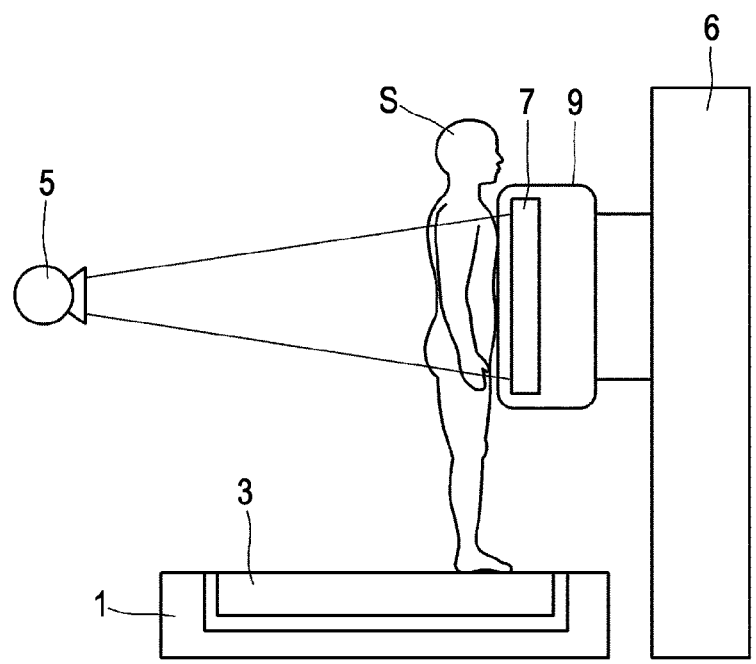
FIG. 2 is a schematic diagram illustrating the radiographic apparatus in a still image capturing mode.

FIG. 2 is a schematic diagram illustrating the radiographic apparatus in a still image capturing mode, which is another image capturing mode that can be set in the radiographic apparatus. The support member 4 can be removed from the position thereof in the CT image capturing mode shown in FIG. 1, or be temporarily moved to a withdrawal position. After the support member 4 is removed from the X-ray irradiation area, the subject S is caused to stand upright at a position near the image capturing unit 9. In this state, a still-image capturing operation can be performed for any part of the body of the subject S. The X-ray irradiation area expands in a cone shape as the distance from the X-ray tube 5 increases. Therefore, normally, the subject S can be positioned as close to the image capturing unit 9 as possible. When the subject S is sufficiently close to the X-ray detector 7, the detection area of the X-ray detector 7 can be maximally used and high resolution images can be obtained.

Figure 3:
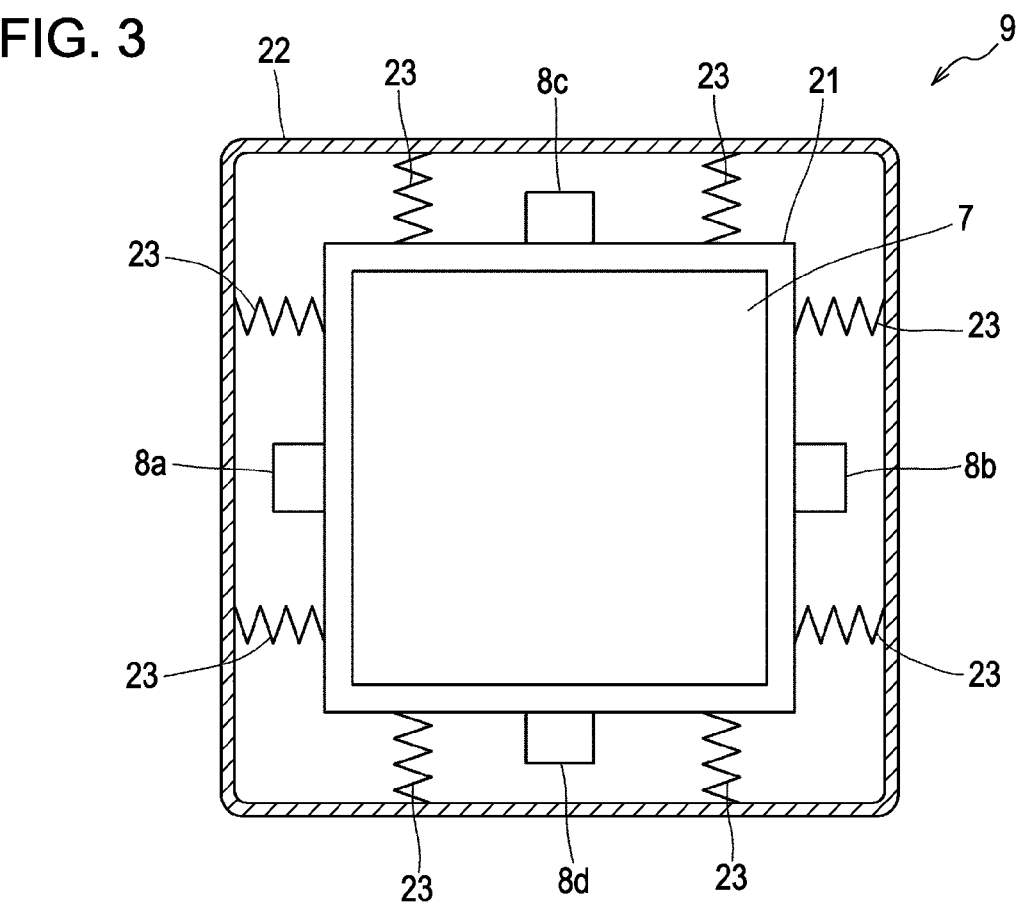
FIG. 3 is a sectional front view of an image capturing unit.
Figure 4:
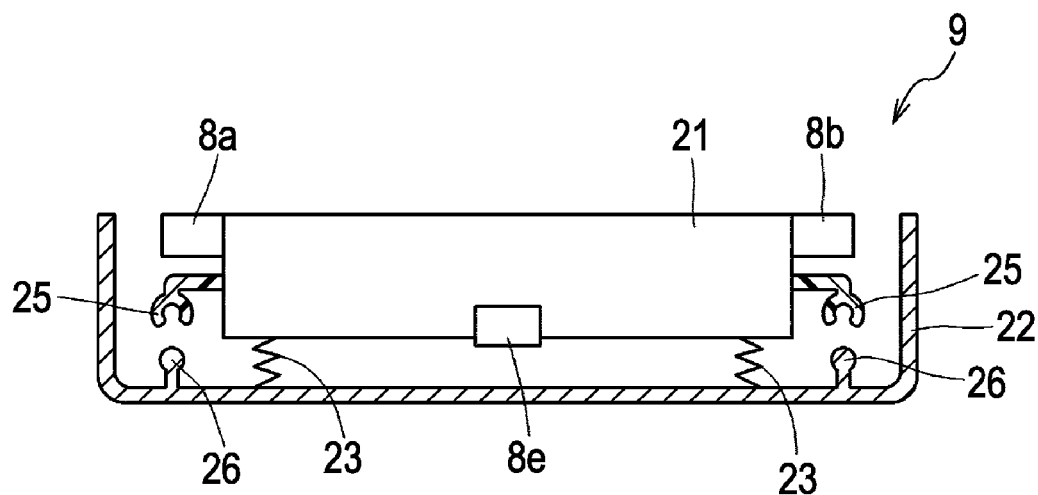
FIG. 4 is a sectional top view of the image capturing unit in the state in which a cover is supported by a frame.

FIG. 3 and FIG. 4 are a sectional front view and a sectional top view, respectively, illustrating the inner structure of the image capturing unit 9. The X-ray detector 7 is fixed to a frame 21, and the frame 21 is attached to the chassis 6. Thus, the X-ray detector 7 is supported such that a detection surface thereof faces the X-ray tube 5. A cover 22 which functions as a buffer member and moves in an elastic manner is provided so as to cover the exterior of the frame 21 so that the inner components, such as the X-ray detector 7 and the frame 21, can be protected. Elastic members 23, such as springs, are attached between the outer periphery of the frame 21 and the cover 22. In a normal state, the cover 22 is supported only by the elastic members 23. When no external force is applied to the cover 22, the cover 22 is retained at a substantially central position of a movable area thereof, that is, at a position where elastic forces applied by the elastic members 23 are balanced with one another.

The elastic members 23 can either be compression springs or draft springs. Alternatively, elastic members made of other materials, such as rubber, can also be used without problems.

Although a plurality of elastic members 23 are provided in FIG. 3, a single elastic member having a large size can also be used. Contact detector elements 8a to 8d are provided on top, bottom, left, and right side faces of the frame 21, and a contact detector element 8e is provided on a front face of the frame 21. The contact detector elements 8a to 8e can be, for example, sensors like photo interrupters which use light or micro switches which react when they come into contact with the cover 22.

The frame 21 has engaging members 25 made of synthetic resin, and the cover 22 has engaging members 26 made of synthetic resin which are engageable with the respective engaging members 25. The engaging members 25 and the engaging members 26 form restraining members for fixing the cover 22 to the frame 21. The engaging members 25 have C-shaped portions. The engaging members 26 have, for example, spherical projections at the ends thereof so as to be engageable with the engaging members 25. Thus, the restraining members formed of the engaging members 25 and 26 are provided in pairs. In general, a plurality of pairs of engaging members 25 and 26 are provided in accordance with the size of the cover 22.

When an external object comes into contact with or collides with the image capturing unit 9, the cover 22 moves in the direction of contact against the elastic forces applied by the elastic members 23. Thus, the impact of contact or collision can be somewhat reduced. When the cover 22 moves, at least one of the contact detector elements 8a to 8e detects the approach or contact of the cover 22 and transmits a detection signal to the system controller 13.

Then, when the external object is separated from the image capturing unit 9, the cover 22 returns to the initial position due to the elastic forces applied by the elastic members 23. In addition, the transmission of detection signal from the contact detector elements 8a to 8e stops, so that the radiographic apparatus can prepare for the next image-capturing operation.

Although the main function of the cover 22 is to block dust and protect the inner components, the cover 22 also functions as a buffer member for reducing the impact and as a moving member for activating the contact detector elements 8a to 8e. Thus, the cover 22 contributes to improving the safety of the radiographic apparatus.

In the first embodiment, the engaging members 25 are made of synthetic resin having elasticity and the engaging members 26 have spherical projections at the ends thereof so as to be engageable with the engaging members 25. However, other types of engaging members can also be used. For example, metal springs or components like sucker discs and magnets which use an attractive force can also be used. In addition, similar effects can also be obtained when the engaging members 25 are provided on the cover 22 and the engaging members 26 are provided on the frame 21.

Figure 5:
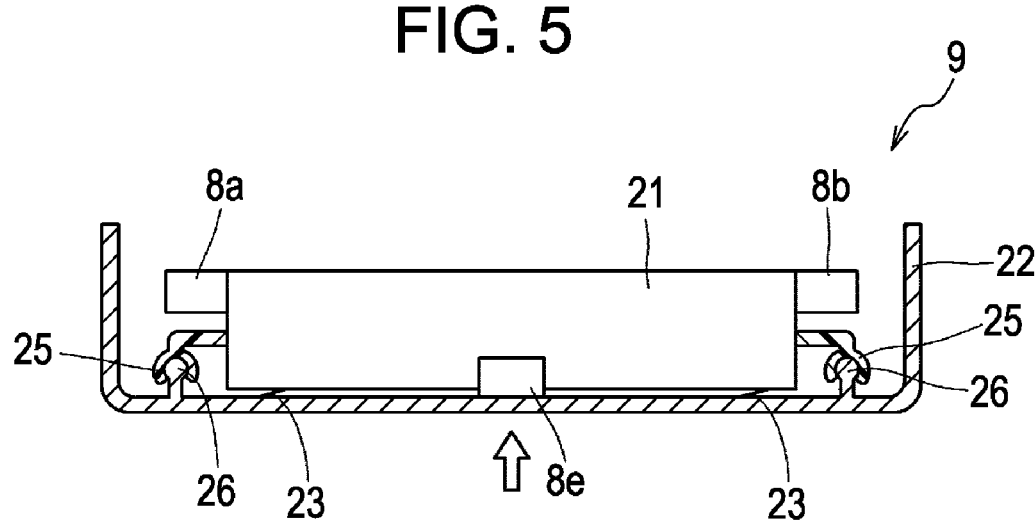
FIG. 5 is a sectional top view of the image capturing unit in the state in which the cover is fixed to the frame.

When the cover 22 is moved with respect to the frame 21 in a direction toward the detection surface of the X-ray detector 7, the cover 22 receive the elastic forces from the elastic members 23 on the frame 21 but finally moves to the position shown in FIG. 5 from the position shown in FIG. 4. In other words, the state in which the engaging members 25 and the engaging members 26 are engaged with each other is maintained, provided that the total elastic force applied by the elastic members 23 is smaller than the pulling force by which the engaging members 25 can be released. The cover 22 can be fixed to the frame 21 by holding a part of the cover 22 and applying a pressing force thereto. In addition, the state shown in FIG. 4 can be reestablished when an operator applies a pulling force in a direction such that the engaging members 25 and the engaging members 26 can be released from each other.

As described above, in the state shown in FIG. 5, the position of the cover 22 with respect to the frame 21 is maintained. The state shown in FIG. 4 and the state shown in FIG. 5 can be selectively established by an operation from the outside. More specifically, a first state shown in FIG. 4 and a second state shown in FIG. 5 can be selectively established. In the first state, the movement of the cover 22, which functions as a buffer member, is not restrained by the restraining members. In the second state, the movement of the cover 22 is restrained.

In the state shown in FIG. 5, the contact detector element 8e provided on the front face of the frame 21 continuously detects the contact or approach of the cover 22. In this state, even if an object comes into contact with or collides with the cover 22, the contact or collision cannot be detected. However, since the contact detector element 8e continuously transmits a detection signal, the system controller 13 maintains the state in which the rotation of the turntable 3 and the X-ray emission are stopped. Therefore, the rotation of the turntable 3 and the X-ray emission are not permitted.

This operation can be used to control the radiographic apparatus such that the still-image capturing operation can be permitted only when it is detected by the contact detector element 8e that the cover 22 is fixed. Thus, the risk that the turntable 3 will be rotated in the still image capturing mode due to an error can be reduced.

Figure 6B:
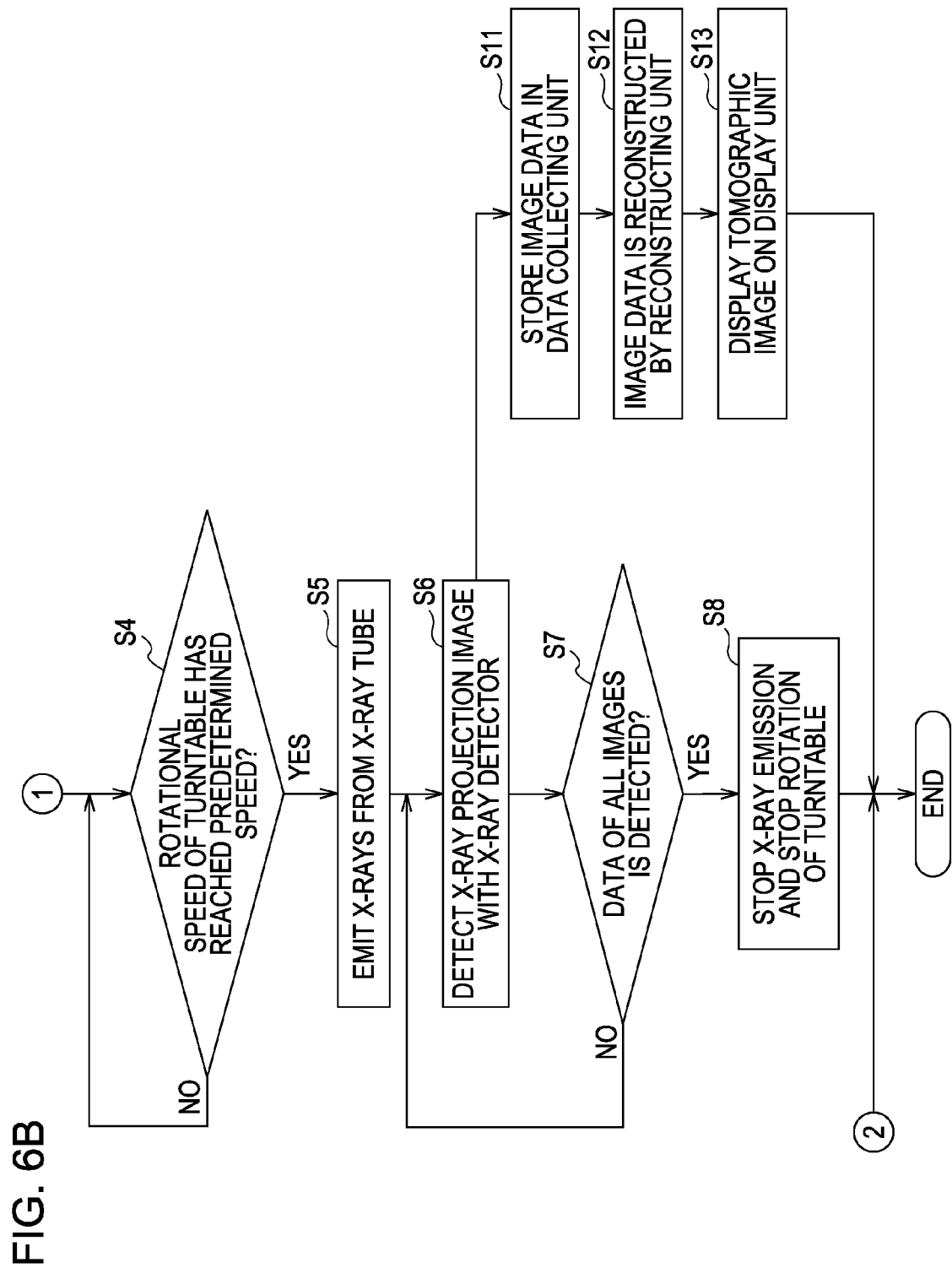

FIGS. 6A and 6B show a flowchart of a basic image capturing operation in a first image capturing mode, that is, the CT image capturing mode. In step S1, the CT mode is selected as the image capturing mode by the input unit 14 and settings of various image capturing parameters are performed. Thus, the radiographic apparatus is prepared for the process. The subject S is caused to stand on the platform 1 at a predetermined position using the support member 4. In step S2, it is determined whether or not a start command for starting the image capturing operation is input by the operator through the input unit 14. If the start command is input, the process proceeds to step S3. If the start command is not input, step S2 is repeated until the start command is input.

In step S3, the drive unit 2 starts to rotate the turntable 3 and accelerates the rotation of the turntable 3. Then, in step S4, it is determined whether or not the rotational speed of the turntable 3 has reached a predetermined rotational speed. If it is determined that the predetermined rotational speed has been reached, the process proceeds to step S5. If it is determined that the predetermined rotational speed has not yet been reached, step S4 is repeated until the rotational speed reaches the predetermined rotational speed.

In step S5, X-rays are emitted toward the subject S from the X-ray tube 5 under predetermined irradiation conditions. Then, in step S6, the X-ray detector 7 starts detecting X-ray projection images and successively captures X-ray image data of portions of the subject S and the support member 4 which are positioned in the X-ray irradiation area at intervals of a predetermined angle of rotation of the turntable 3. Then, in step S7, it is determined whether or not the turntable 3 has rotated by 360° after the start of the image capturing operation for the subject S and all of the X-ray projection images for a single image capturing operation are obtained. If it is determined that all of the X-ray projection images are obtained, the process proceeds to step S8. If it is determined that not all of the X-ray projection images are yet obtained, the process proceeds to step S6 and the detection of the X-ray projection images performed by the X-ray detector 7 is continued. In step S8, the emission of the X-rays is immediately stopped and the drive unit 2 decelerates and stops the rotation of the turntable 3. Thus, the flow of the image capturing operation is ended.

The image data of the X-ray projection images which are successively detected in step S6 at intervals of a predetermined angle of rotation of the turntable 3 is successively transmitted to and stored in the data collecting unit 10 in step S11. Then, in step S12, the reconstructing unit 11 performs a reconstruction process for reconstructing the image data. Then, in step S13, the display unit 12 displays a tomographic image or a three-dimensional image obtained by the reconstruction process performed in step S12. Thus, the operator can obtain information necessary for diagnosis, observation, or the like.

When the CT mode is selected as the image capturing mode in step S1, the process not only proceeds to step S2 but also proceeds to step S21, where signals are received from the contact detector elements 8a to 8e and it is determined whether or not a contact is detected. If a contact is detected, the process proceeds to step S22. If no contact is detected, the process proceeds to step S23. In step S23, whether or not a contact is detected is continuously monitored by repeating step S21 until the flow of the image capturing operation performed in steps S1 to S8 is ended. Then, the monitoring is stopped when the flow of the image capturing operation is ended.

If a contact or collision with the subject S or a portion of the support member 4 is detected in step S21, the process proceeds to step S22 and a detection signal representing that a contact or collision has occurred is transmitted to the system controller 13. Then, in step S24, the system controller 13 determines to make an emergency stop and transmits an X-ray emission stop command to the X-ray tube 5 and a rotation stop command to the drive unit 2. Then, in step S25, the X-ray emission and the rotation of the turntable 3 are immediately stopped. If the turntable 3 is not rotated, the stationary state thereof is maintained. If the X-ray emission is not performed, the stopped state is maintained.

Thus, a safety mechanism is provided by the contact detector elements 8a to 8e and the flow of steps S21 to S25. As a result, damage such as injury to the subject S due to a contact or collision with the subject S or the support member 4 can be reduced in the CT image capturing mode which involves rotation of components. Therefore, the radiographic apparatus can be safely operated.

According to the above description, the CT image capturing operation is performed using the image capturing system including the X-ray tube 5 and the image capturing unit 9 which are stationary while rotating the subject S on the turntable 3. However, since the CT image capturing operation can be performed by moving the image capturing system and the subject S relative to each other, the image capturing system can be rotated instead of the subject S. More specifically, the subject S can be in a stationary state while a support member, typically a C-arm, which supports both the X-ray tube 5 and the image capturing unit 9 is rotated. In such a case, the turntable 3 for restraining the subject S can be omitted, and the drive unit 2 is connected to the support member of the X-ray tube 5 and the image capturing unit 9 to transmit a rotating force thereto. C-arm image capturing apparatuses are commonly used in the CT image capturing operation, and the present embodiment can also be applied to this type of image capturing apparatuses.

An operation flow for the still image capturing mode is different from the operation flow for the CT image capturing mode shown in FIGS. 6A and 6B. More specifically, after the image capturing mode is selected and settings of various image capturing parameters are made in a step corresponding to step S1, steps of emitting X-rays, capturing an image, and stopping the emission of the X-rays are performed. Then, the operation ends.

In the still image capturing mode, the subject S is caused to stand upright near the image capturing unit 9. At this time, according to the first embodiment, the cover 22 is moved closer to the detection surface of the X-ray detector 7 and then fixed to the frame 21. This is advantageous because the resolution of the captured images can be increased as the distance between the subject S and the X-ray detector 7 is reduced, as described above.

Figure 7:
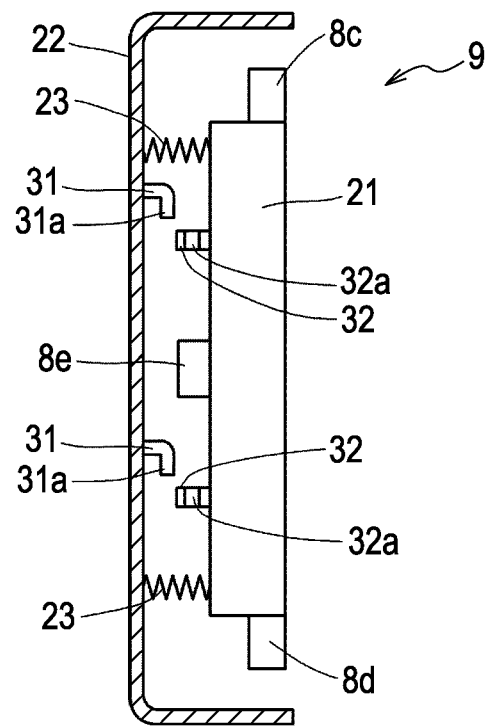
FIG. 7 is a sectional side view of an image capturing unit according to a modification in the state in which a cover is supported by a frame.

As a modification of the first embodiment, the cover 22 can be fixed to the frame 21 by being moved in a direction different from the above-described direction. FIG. 7 is a sectional side view of the image capturing unit 9 according to the modification. In FIG. 7, the vertical direction corresponds to the body axis of the subject S.

Figure 8:
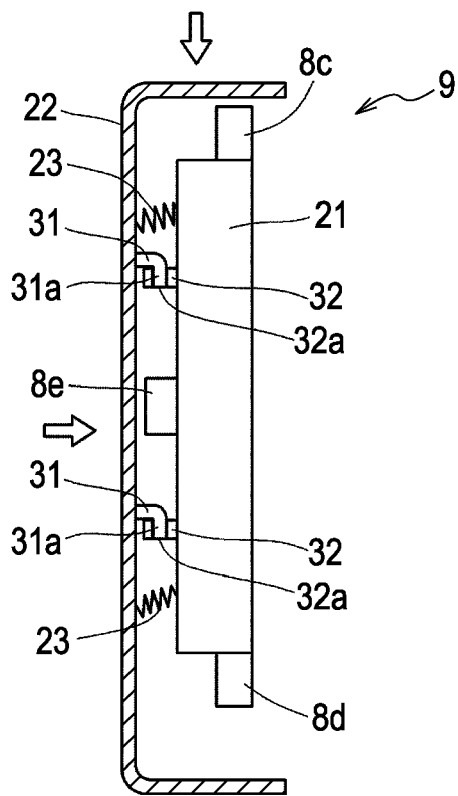
FIG. 8 is a sectional side view of the image capturing unit shown in FIG. 7 in the state in which the cover is fixed to the frame.

The image capturing unit 9 according to the modification is provided with engaging members 31 and engaging members 32 having shapes different from those in the image capturing unit 9 shown in FIG. 4. The engaging members 31 are provided on the cover 22 and have hook-shaped portions 31a. The engaging members 32 are provided on the frame 21 and have ring-shaped portions 32a. As shown in FIG. 8, ends of the hook-shaped portions 31a of the engaging members 31 can be engaged with the ring-shaped portions 32a of the respective engaging members 32.

The engaging members 31 cannot be engaged with the engaging members 32 when the cover 22 is simply pushed toward the frame 21, but can be engaged with the engaging members 32 if the cover 22 is pushed downward along the body axis of the subject S after being pushed toward the frame 21. Once the engagement is completed, the cover 22 does not return to the initial position by itself even when the elastic forces of the elastic members 23 are applied thereto. The cover 22 can be returned to the initial position due to the operation of the elastic members 23 when the operator applies an upward force below in the order reverse to that in the case of fixing the cover 22.

In the still image capturing mode, when, for example, an image of the entire lung field of the subject S is to be captured by placing the chest of the subject S is near the image capturing unit 9, an area of the subject S that covers the shoulders must be placed within the detection area. In such a case, there is a possibility that a portion of the cover 22 of the image capturing unit 9 comes into contact with the chin of the subject S.

Therefore, the image capturing unit 9 can be structured such that the X-ray detector 7 is disposed as close to the cover 22 as possible. In the case of fixing the cover 22 to the frame 21 by changing the positional relationship therebetween, if the cover 22 is fixed with the engaging members 31 and the engaging members 32 by moving the cover 22 downward along the body axis of the subject S, the following advantages can be obtained.

That is, when an image of the chest of the subject S is captured in the still-image capturing operation, the possibility of interference between the chin of the subject S and the cover 22 can be reduced because the distance between the X-ray detector 7 and the cover 22 is reduced. As a result, the area including the shoulders of the subject S can be positioned within the detection area, and an image of the entire lung field of the subject S can be easily captured.

When the CT image capturing operation is performed, an object can come into contact with or collide with the cover 22 such that the cover 22 is pushed toward the X-ray detector 7 by a long distance. In such a case, in the structure shown in FIG. 4, there is a possibility that the engaging members 25 will become engaged with the engaging members 26. Although the contact or collision with the external object can be detected, the operator must return the cover 22 to the original position to restore the initial state.

In comparison, in the image capturing unit 9 shown in FIG. 7, the engaging members 31 do not come into engagement with the engaging members 32 unless forces in two directions are applied to the cover 22 in a certain order. Therefore, the possibility that the operator must return the cover 22 to the original position can be considerably reduced.

The image capturing unit 9 shown in FIG. 5 and the image capturing unit 9 shown in FIG. 8 are both in the state in which the cover 22 is fixed to the frame 21 and at least one of the contact detector elements 8a to 8e is operated. Therefore, the system controller 13 recognizes that the cover 22, which functions as the buffer member, is fixed.

Therefore, the apparatus can be controlled such that the rotation of the turntable 3 and the CT image capturing operation are prohibited unless the impact reducing function provided by the cover 22 and the safety mechanism of the contact detector 8 are activated. This is considerably advantageous for safe operation of the apparatus.

In the first embodiment, the operator manually operates the cover 22 to fix the cover 22. However, the cover 22 may also be operated with a mechanism such as a lever or a link. Alternatively, an electric motor or an actuator such as a hydraulic actuator can also be used to operate the cover 22.

Figure 9:
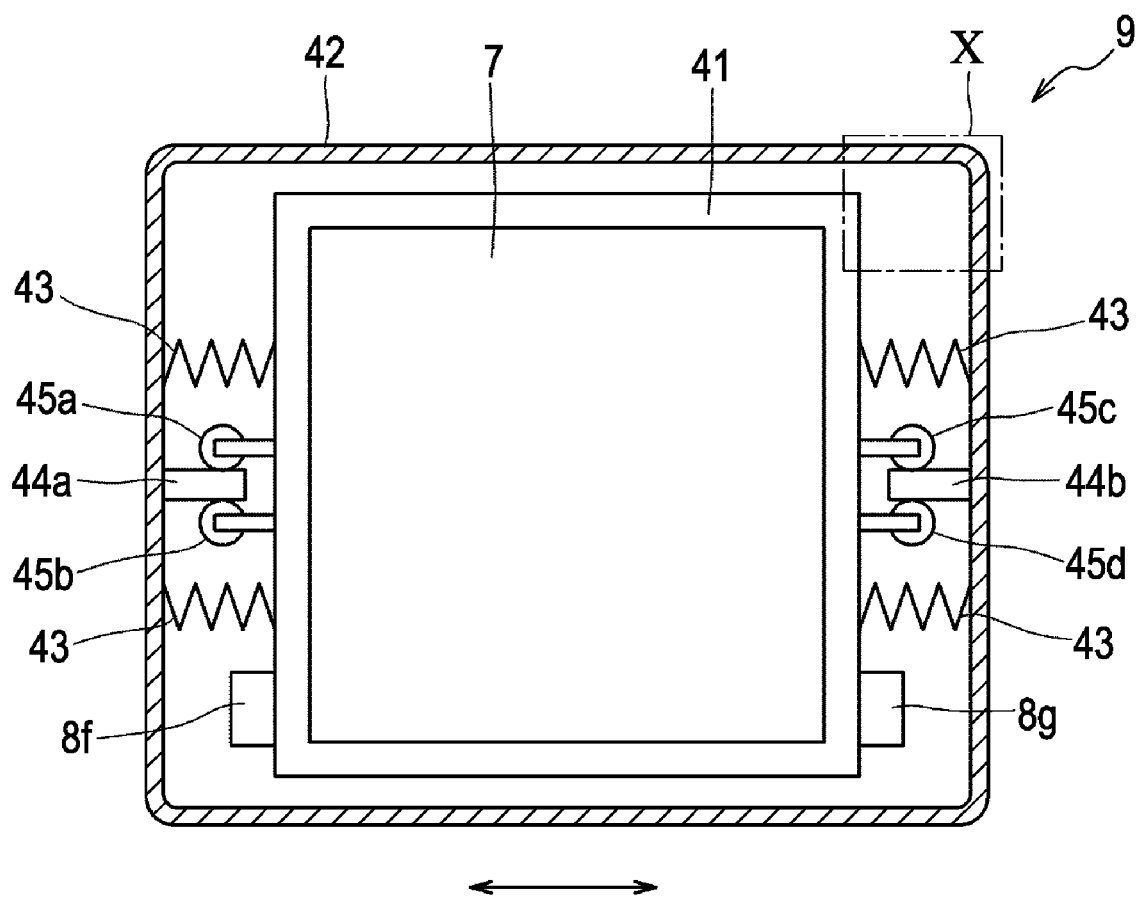
FIG. 9 is a sectional front view of an image capturing unit according to a second embodiment.

FIG. 9 is a sectional front view illustrating the inner structure of an image capturing unit 9 according to a second embodiment. Components similar to those in the first embodiment are denoted by the same reference numerals. The X-ray detector 7 is fixed to a frame 41, and a cover 42 is provided so as to cover the X-ray detector 7 and the outer periphery of the frame 41. The frame 41 and the cover 42 are elastically supported by elastic members 43. When no external force is applied to the cover 42, the cover 42 is retained at a position within a movable stroke thereof in the left-right direction where elastic forces applied by the elastic members 43 are balanced with one another. Contact detector elements 8f and 8g for detecting a contact between an external object and the cover 42 are fixed to a peripheral surface of the frame 41. Guides 44a and 44b are provided on the inner surface the cover 42, and rollers 45a to 45d are provided on the frame 41. The guides 44a and 44b are respectively disposed between the rollers 45a and 45b and between the rollers 45c and 45d. Thus, the cover 42 is supported by the frame 41 such that the cover 42 is movable in the direction shown by the arrow.

The cover 42 according to the second embodiment functions as a buffer member having an impact reducing function in the direction shown by the arrow in FIG. 9. Similar to the first embodiment, the elastic members 43 can either be compression springs or draft springs. Alternatively, elastic members made of other materials, for example rubber, can also be used.

When a portion of the cover 42 approaches or comes into contact with the frame 41, such a movement is detected by at least one of the contact detector elements 8f and 8g and a detection signal is transmitted to the system controller 13. Similar to the first embodiment, the contact detector elements 8f and 8g can be, for example, sensors like photo interrupters which use light or micro switches which react when they come into contact with an object.

When an external object comes into contact with or collides with the image capturing unit 9, the cover 42 moves against the elastic forces applied by the elastic members 43. When the cover 42 receives a leftward or rightward force from the outside along the direction of the arrow, the cover 42 moves in the direction of the force while being guided by the guides 44a and 44b and the rollers 45a to 45d. When the cover 42 moves leftward, the contact detector element 8f detects the movement. When the cover 42 moves rightward, the contact detector element 8g detects the movement.

Although the image capturing unit 9 has two contact detector elements 8f and 8g, an element capable of detecting both of the leftward and rightward movements of the cover 42 can also be used. When the external force is eliminated, the cover 42 returns, due to the elastic forces applied by the elastic members 43, to the initial position where the elastic forces of the elastic members 43 balance with each other. In addition, the transmission of the detection signal from the contact detector elements 8f and 8g stops, so that the radiographic apparatus can prepare for the next image-capturing operation.

In the second embodiment, the overall body of the cover 42 functions as the buffer member. However, the cover 42 can also be structured such that only portions of left and right side sections, where contact or collision is most likely to occur, are individually moveable along the direction of the arrow. However, in the image capturing unit 9 according to the second embodiment, since the entire body of the cover 42 functions as the buffer member, the buffer effect can be obtained not only when the contact or collision occurs at the left and right sections but also when an external object comes into contact with the front face, the top face, or the bottom face of the cover 42. More specifically, the cover 42 is moved leftward or rightward by a frictional force, so that the buffer effect can be obtained and the contact can be detected. As a result, the damage can be reduced.

Different from the first embodiment, in the second embodiment, only the movement of the cover 42 in the direction of the arrow, that is, in the left-right direction can be detected. This arrangement is adopted for the following reason. That is, in the relative movement between the image capturing unit 9 and the turntable 3, the tangential direction of rotation of the turntable 3 coincides with the direction of the arrow. Therefore, the direction in which the contact or collision can occur coincides with the direction of the arrow. The rotation of the turntable 3 causes no contact or collision in directions other than the direction of the arrow. Therefore, only the movement in the direction of the arrow is set to be detectable. Since it is not necessary to provide contact detector elements for detecting the movement of the cover 42 in other directions, the size and weight of the image capturing unit 9 can be reduced. In addition, the distance between the X-ray detector 7 and the cover 42 can be easily reduced.

In the case where, for example, the turntable 3 rotates only in one direction in the image capturing operation and contact or collision occurs only at one end in the direction of the arrow, the number of contact detector elements can be reduced to one. In such a case, the structure of the apparatus can be simplified and the manufacturing cost can be reduced.

In the second embodiment, the guiding function is obtained by the rollers 45a to 45d and the guides 44a and 44b disposed therebetween. However, the guiding function can also be obtained by other components, such as shafts and translation bearings. In addition, similar effects can also be obtained by a guide that defines an arc locus centered on the rotational center of the turntable 3. In such a case, a buffer member is structured to be movable in a rotational direction along a circumference substantially centered on the rotational axis O.

Figure 10A:
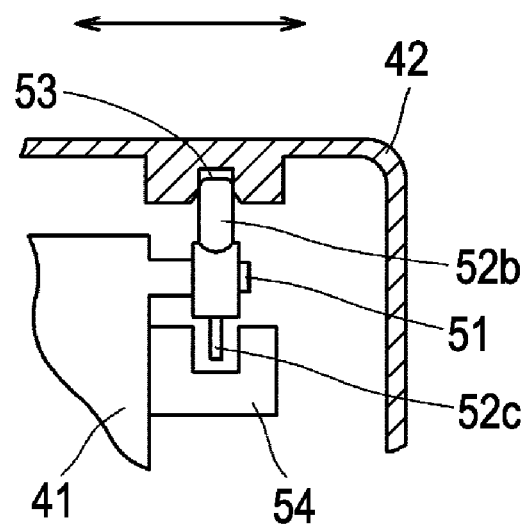
FIGS. 10A to 10C are schematic diagrams illustrating a restraining member.
Figure 10B:
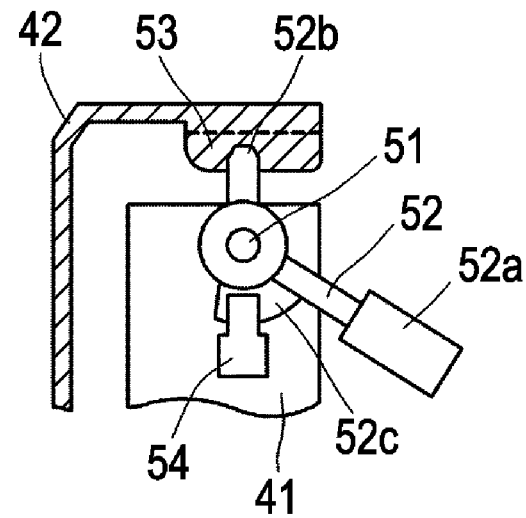
Figure 10C:
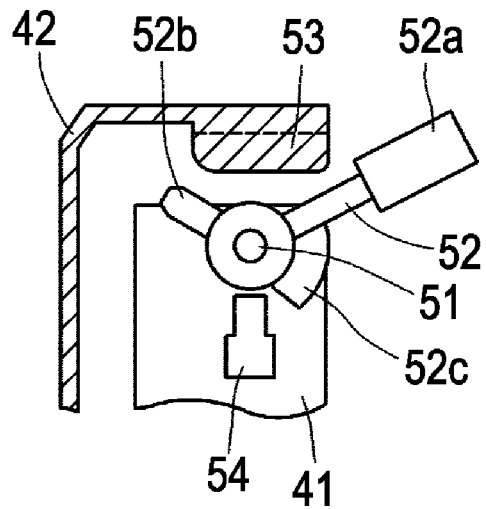

FIGS. 10A to 10C are schematic diagrams illustrating a restraining member disposed in a section denoted by X in FIG. 9. FIG. 10A is a partial sectional view as seen along the same direction as FIG. 9. FIGS. 10B and 10C are partial sectional views as seen from the side in different states.

The frame 41 has a lever shaft 51 to which an operation lever 52 for switching the state of the restraining member between an activated state and an inactivated state is attached. The operation lever 52 rotates about the axial center of the lever shaft 51. The operation lever 52 has a handle portion 52a to which a force is applied and which extends to the outside of the cover 42 so that the handle portion 52a can be manually operated from the outside. In addition, the operation lever 52 has a projecting portion 52b, and a groove 53 is formed in the inner surface of the cover 42. The width of the groove 53 is set such that the projecting portion 52b of the operation lever 52 can be fitted to the groove 53.

A state detector 54 is provided on the frame 41 at a position near the operation lever 52. The state detector 54 includes a photo interrupter or the like and detects whether or not the movement of the cover 42 is restrained by the operation lever 52. In the present embodiment, the operation lever 52 has a chopper 52c which blocks a light path so that the rotational position of the operation lever 52 can be detected. However, another type of element, such as a mechanical switch, may also be used instead of the photo interrupter.

Similar to the contact detector elements 8f and 8g which detect contact or collision of the image capturing unit 9, the state detector 54 is also electrically connected to the system controller 13. It is determined from the positional information of the operation lever 52 whether the cover 42 is in a first state in which the movement thereof is not restricted by the restricting unit or a second state in which the movement thereof is restricted by the restricting unit. Then, a signal representing the state of the cover 42 is transmitted to the system controller 13.

In the state shown in FIG. 10B, the handle portion 52a of the operation lever 52 is moved to a downstream position, and the projecting portion 52b is fitted to the groove 53. Therefore, the movement of the cover 42 in the direction of the arrow is restricted and the second state is established in which the cover 42 does not move even when a leftward or rightward force is applied. In the state shown in FIG. 10C, the handle portion 52a of the operation lever 52 is moved to an upstream position, and the projecting portion 52b is not fitted to the groove 53. Therefore, the first state is established in which the cover 42 is movable in the direction of the arrow in FIG. 9.

As described above, the first state in which the movement of the cover 42 is not restricted and the second state in which the movement of the cover 42 is restricted can be selectively set by the restricting unit. When the second state is established in which the restricting unit serves to restrict the movement of the cover 42, the subject S can be easily positioned in the case of performing the still-image capturing operation even if the image capturing unit 9 and the subject S are brought into contact with each other.

Figure 11B:
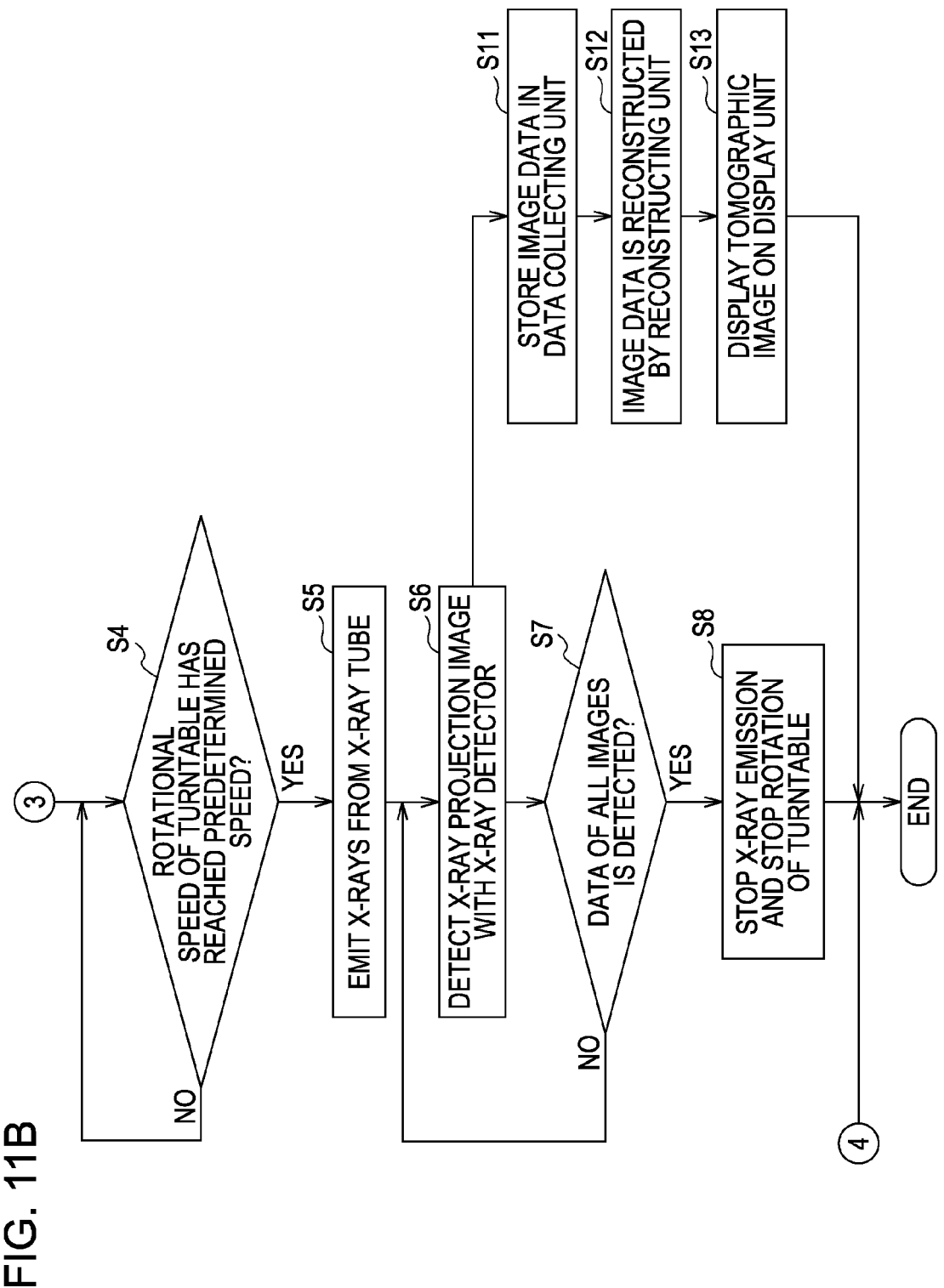

FIGS. 11A and 11B show a flowchart of a basic image capturing operation according to a second embodiment. In the following description, only steps different from those of the flowchart according to a first embodiment will be described.

After step S1, step S1' is performed before the rotation of the turntable 3 is started by the drive unit 2. In step S1', it is determined whether or not the cover 42 is fixed. In the first state in which the movement of the cover 42 is not restrained, the process proceeds to step S2.

If it is determined in step S1' that the second state is set in which the movement of the cover 42 is restrained, the operation of the drive unit 2 is not permitted because a contact or collision between the cover 42 and an external object cannot be detected. Then, the process proceeds to step S1" and the system controller 13 causes the display unit 12 to display a message prompting the operator to operate the operation lever 52. Then, the process returns to step S1'. If the operator operates the operation lever 52 and the state changes to the first state in which the movement of the cover 42 is not restrained, the process proceeds to step S2.

According to the above-described control process, the operation of the drive unit 2 is prohibited if the second state is established in which the impact reducing function of the cover 42 and the safety mechanism of the contact detector elements 8f and 8g are not activated. Accordingly, the risk that the subject S or the like will come into contact with the image capturing unit 9 and cause damage can be reduced. In addition, since the message for the operator is displayed on the display unit 12, the operator can be informed of the fact that the rotation of the turntable 3 is prohibited and quickly change the state to the first state so that the image capturing operation can be started.

In the above-described structure, the operation lever 52 is manually operated. However, the restraining member can also be switched by an electric motor or an actuator, such as a hydraulic actuator, in response to a command from the system controller 13. In such a case, the system controller 13 outputs a command signal to the actuator instead of causing the display unit 12 to display a message for prompting the user to operate the lever in step S1". Thus, the apparatus can be structured such that the operation lever 52 is automatically operated. In such a case, the image capturing operation can be quickly restarted.

Figure 12:
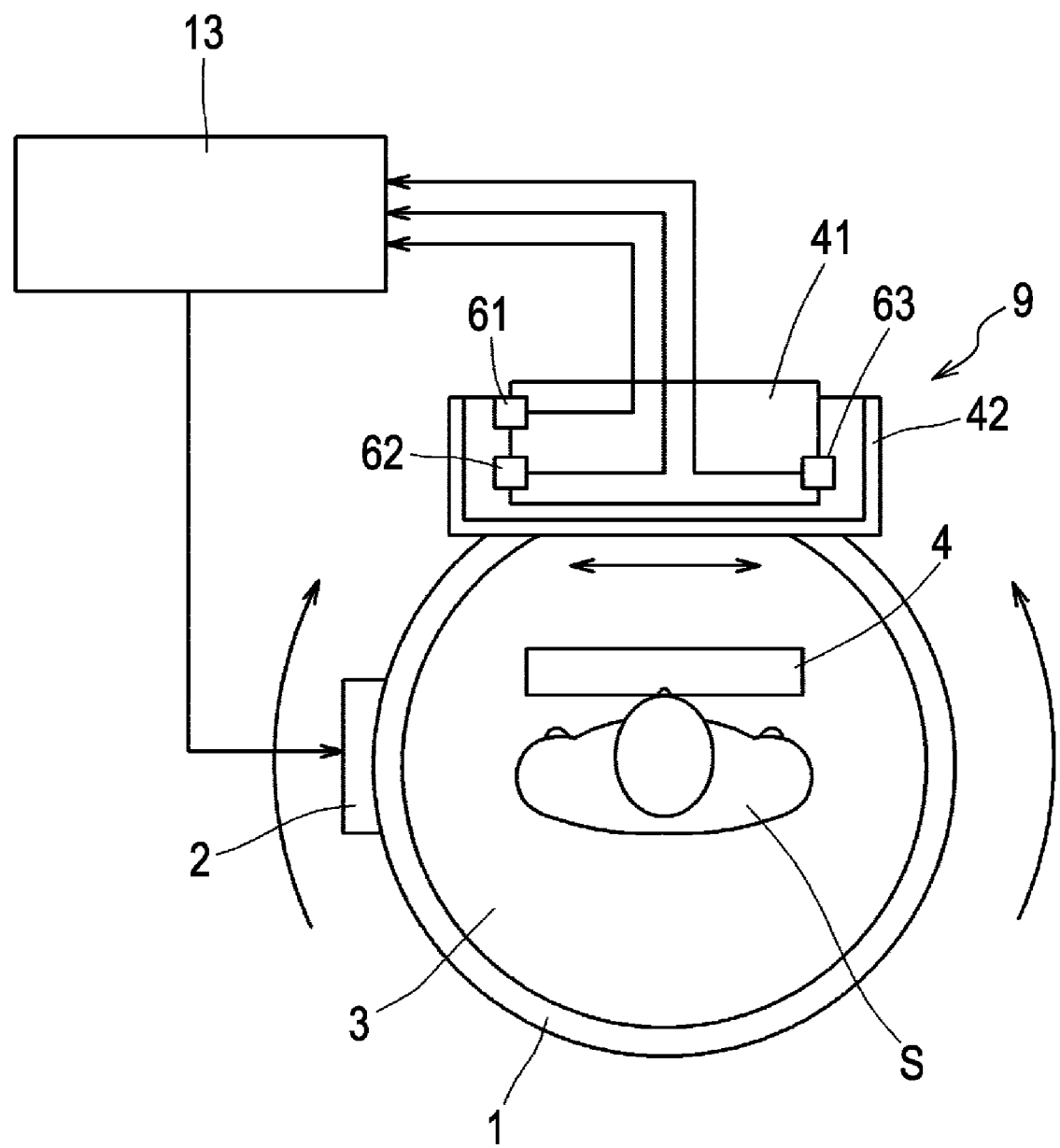
FIG. 12 is a schematic diagram illustrating a radiographic apparatus according to a modification.

FIG. 12 is a schematic diagram illustrating an image capturing system according to a modification of the second embodiment. The image capturing unit 9 is provided with sensors 61 to 63 for detecting whether or not the cover 42 is fixed. Outputs from the sensors 61 to 63 are transmitted to the system controller 13.

The sensor 61 detects whether or not the cover 42 is fixed. If the first state is established in which the movement of the cover 42 is not restricted, an off signal is transmitted to the system controller 13. If the second state is established in which the movement of the cover 42 is restricted, an on signal is transmitted to the system controller 13.

The sensor 62 detects a movement of the cover 42. More specifically, the sensor 62 detects a rightward movement of the cover 42 along the direction shown by the arrow, and corresponds to the contact detector element 8f in the above-described embodiment. The sensor 62 is normally in the off state, and transmits an on signal to the system controller 13 only when the cover 42 moves rightward along the direction of the arrow and approaches the sensor 62. When the cover 42 moves leftward along the direction of the arrow, the off state is maintained.

The sensor 63 detects a movement of the cover 42. More specifically, the sensor 63 detects a leftward movement of the cover 42 along the direction shown by the arrow, and corresponds to the contact detector element 8g in the above-described embodiment. The sensor 62 is normally in the off state, and transmits an on signal to the system controller 13 only when the cover 42 moves leftward along the direction of the arrow and approaches the sensor 63. When the cover 42 moves rightward along the direction of the arrow, the off state is maintained.

The system controller 13 receives the signals from the sensors 61 to 63 and controls the rotation of the turntable 3 operated by the drive unit 2 in accordance with the states of the sensors 61 to 63. The rotation of the turntable 3 is controlled as shown in Table 1.

TABLE 1

| | Sensor Status | | | Control Rotation Permitted |
|---|---|---|---|---|
| | Sensor 61 | Sensor 62 | Sensor 63 | |
| Status A | OFF | OFF | OFF | CW Permitted CCW Stopped |
| Status B | OFF | OFF | ON | CCW Permitted CW Stopped |
| Status C | OFF | ON | OFF | (Impossible) |
| Status D | OFF | ON | ON | Rotation Prohibited Stop Control |
| Status E | ON | OFF | OFF | (Impossible) |
| Status F | ON | OFF | ON | (Impossible) |
| Status G | ON | ON | OFF | (Impossible) |
| Status H | ON | ON | ON | (Impossible) |

Referring to Table 1, when Status A is set, the rotation of the turntable 3 is permitted. When a rotation start command is input from the input unit 14, a control signal for starting the drive unit 2 is transmitted thereto. The rotation is permitted irrespective of the rotational direction.

When status B is set, that is, when the sensor 63 is switched to the ON state from status A, it can be determined that the cover 42 is moving leftward along the direction of the arrow. Therefore, there is a possibility that an external object has come into contact with or collided with the right side surface of the cover 42. Therefore, in this case, the movement in a direction such that the contact between the object and the right side surface of the cover 42 is enhanced, that is, the rotation of the turntable 3 in the counterclockwise (CCW) direction is stopped.

If the turntable 3 is being rotated in the CCW direction, a rotation stop signal is transmitted to the drive unit 2. If the turntable 3 is stationary but a command to start rotating in the CCW direction is issued, the rotation is prohibited. If a command to start rotating in the clockwise (CW) direction is issued, such a rotation is effective to separate the object from the right side surface of the cover 42. Therefore, the rotation is permitted and a control signal for starting the rotation is transmitted to the drive unit 2.

When status C is set, that is, when the sensor 62 is switched to the ON state from status A, it can be determined that the cover 42 is moving rightward along the direction of the arrow. Therefore, there is a possibility that an external object has come into contact with or collided with the left side surface of the cover 42. Therefore, in this case, the movement in a direction such that the contact between the object and the left side surface of the cover 42 is enhanced, that is, the rotation of the turntable 3 in the CW direction is stopped. If the turntable 3 is being rotated in the CW direction, a rotation stop signal is transmitted to the drive unit 2. If the turntable 3 is stationary but a command to start rotating in the CW direction is issued, the rotation is prohibited. If a command to start rotating in the CCW direction is issued, such a rotation is effective to separate the object from the left side surface of the cover 42. Therefore, the rotation is permitted and a control signal for starting the rotation is transmitted to the drive unit 2.

When status E is set, the second state is established in which the movement of the cover 42, which functions as a contact detection unit, is restricted and the contact or collision with the external object cannot be detected. Therefore, the rotation of the turntable 3 is prohibited in both of the CW and CCW directions. If the turntable 3 is being rotated, a control signal for stopping the rotation irrespective of the direction thereof is transmitted to the drive unit 2.

In the radiographic apparatus according to the present embodiment, it is impossible to set Statuses E, F, G, and H because of the structural limitations.

By performing the above-described control operation, the rotation of the turntable 3 can be stopped if an external object, such as the subject S, comes into contact with or collides with the image capturing unit 9 and there is a risk of damage. Therefore, the level of damage can be reduced and the state after the contact or collision can be easily canceled. In addition, when the operator issues a command to start the rotation for cancelling the contact state, a risk of rotating the turntable 3 in a direction such that the contact is enhanced by mistake can be eliminated. Thus, the safety of the radiographic apparatus can be improved.

According to the radiographic apparatus of the present invention, since the state of the buffer member can be selected and maintained, the subject can easily stand upright at a position near the image capturing unit without degrading the safety in the case where a portion of the apparatus rotates.

In addition, it is not necessary to perform a cumbersome process of attaching and detaching the contact detector. Since the mechanical portion of the contact detector is disposed within the external cover, the apparatus can be easily handed and the burden on the user is reduced.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims. The scope of the following claims is to be accorded the broadest interpretation so as to encompass all modifications and equivalent structures and functions.

This application claims the benefit of Japanese Application No. 2007-284728 filed Nov. 1, 2007, which is hereby incorporated by reference herein in its entirety.

What is claimed is:

1. A radiographic apparatus which includes an image capturing unit having an X-ray detector mounted therein and which obtains image data by detecting X-rays that pass through a subject, the radiographic apparatus comprising:
   a buffer member arranged at an outer periphery of the image capturing unit, the buffer member being capable of moving in an elastic manner; and
   a restraining member configured to restrain the movement of the buffer member, the restraining member being capable of selecting a first state in which the movement of the buffer member is not restricted and a second state in which the movement of the buffer member is restricted.

2. The radiographic apparatus according to claim 1, further comprising:
   a detector configured to detect the movement of the buffer member, the detector functioning as a contact detector that detects a contact between an external object and the image capturing unit.

3. The radiographic apparatus according to claim 2, further comprising:
   a platform on which the subject is positioned so as to face a detection surface of the X-ray detector;
   a drive unit configured to rotate at least one of the image capturing unit and the platform; and
   a drive limiting unit which prohibits the drive unit from operating when the contact detector detects the contact between the external object and the image capturing unit.

4. The radiographic apparatus according to claim 3, wherein the contact detector is capable of detecting contacts in a plurality of directions, and the drive limiting unit performs different limiting processes for the drive unit in accordance with the result of detection of the contacts in the respective directions.

5. The radiographic apparatus according to claim 3, wherein a direction in which the buffer member is moved substantially coincides with a rotational direction of the image capturing unit or the platform.

6. The radiographic apparatus according to claim 3, wherein a direction in which the buffer member is moved substantially coincides with a tangential direction of rotation of the image capturing unit or the platform.

7. The radiographic apparatus according to claim 2, wherein, when the buffer member is in the second state, the buffer member is fixed at a position where a contact is detected by the contact detector.

8. The radiographic apparatus according to claim 7, wherein, when the buffer member is in the second state, the buffer member is fixed at a position to which the buffer member is moved in a direction toward the X-ray detector.

9. The radiographic apparatus according to claim 7, wherein, when the buffer member is in the second state, the buffer member is fixed at a position to which the buffer member is moved downward along a body axis of the subject in an image capturing operation.

10. The radiographic apparatus according to claim 7, wherein the buffer member is fixed at a position to which the buffer member is moved along at least two directions.

11. The radiographic apparatus according to claim 1, wherein the radiographic apparatus is capable of setting at least a first image capturing mode in which an image capturing operation is performed while the image capturing unit and the subject are moved relative to each other by a drive unit without brining the image capturing unit and the subject into contact with each other and a second image capturing mode in which an image capturing operation is performed while the image capturing unit and the subject are stationary, and
   wherein the restraining member selects the second state in the second image capturing mode.

12. The radiographic apparatus according to claim 11, further comprising:
   a display unit configured to display a message prompting an operator to perform an operation for switching the state of the buffer member to the first state if the first image capturing mode is selected while the buffer member is in the second state.

13. The radiographic apparatus according to claim 11, further comprising:
   an actuator for switching the restraining member for the buffer member between an activated state and an inactivated state; and
   a control unit which causes the actuator to change the state of the restraining member for the buffer member to the inactivated state if the first image capturing mode is selected while the buffer member is in the second state.

14. The radiographic apparatus according to claim 1, further comprising:
   a state detector configured to determine whether the buffer member is in the first state or the second state.

15. The radiographic apparatus according to claim 14, further comprising:
   a drive limiting unit which prohibits the drive unit from operating when the state detector determines that the buffer member is in the second state.

* * * * *